Figure 2:
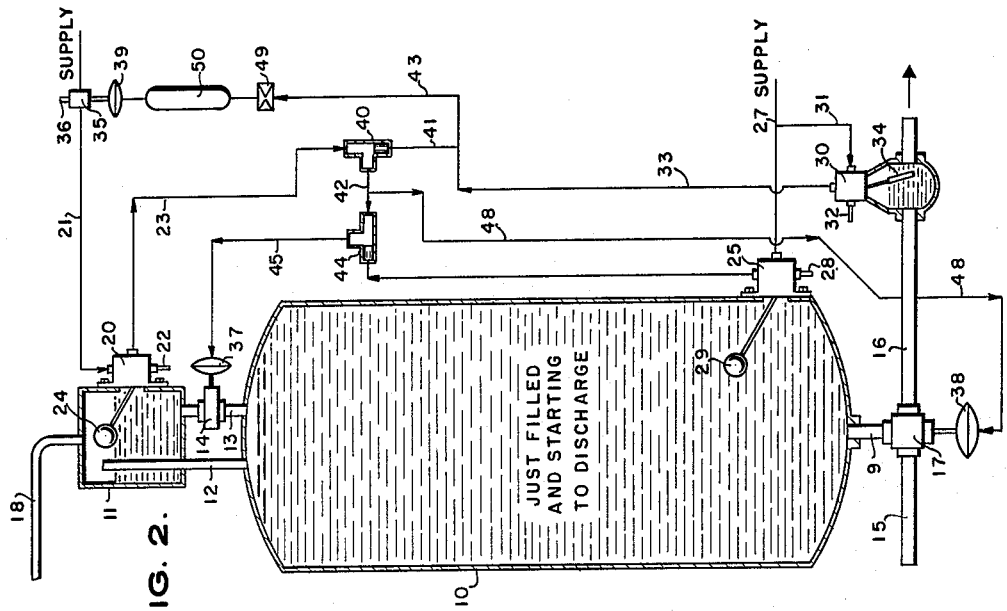

Nov. 8, 1960 M. E. TRUE 2,959,055
FLUID METER

Filed July 9, 1957 3 Sheets-Sheet 1

INVENTOR.
MARTIN E. TRUE,
BY John S. Schneider
ATTORNEY.

Nov. 8, 1960   M. E. TRUE   2,959,055
FLUID METER
Filed July 9, 1957   3 Sheets-Sheet 2
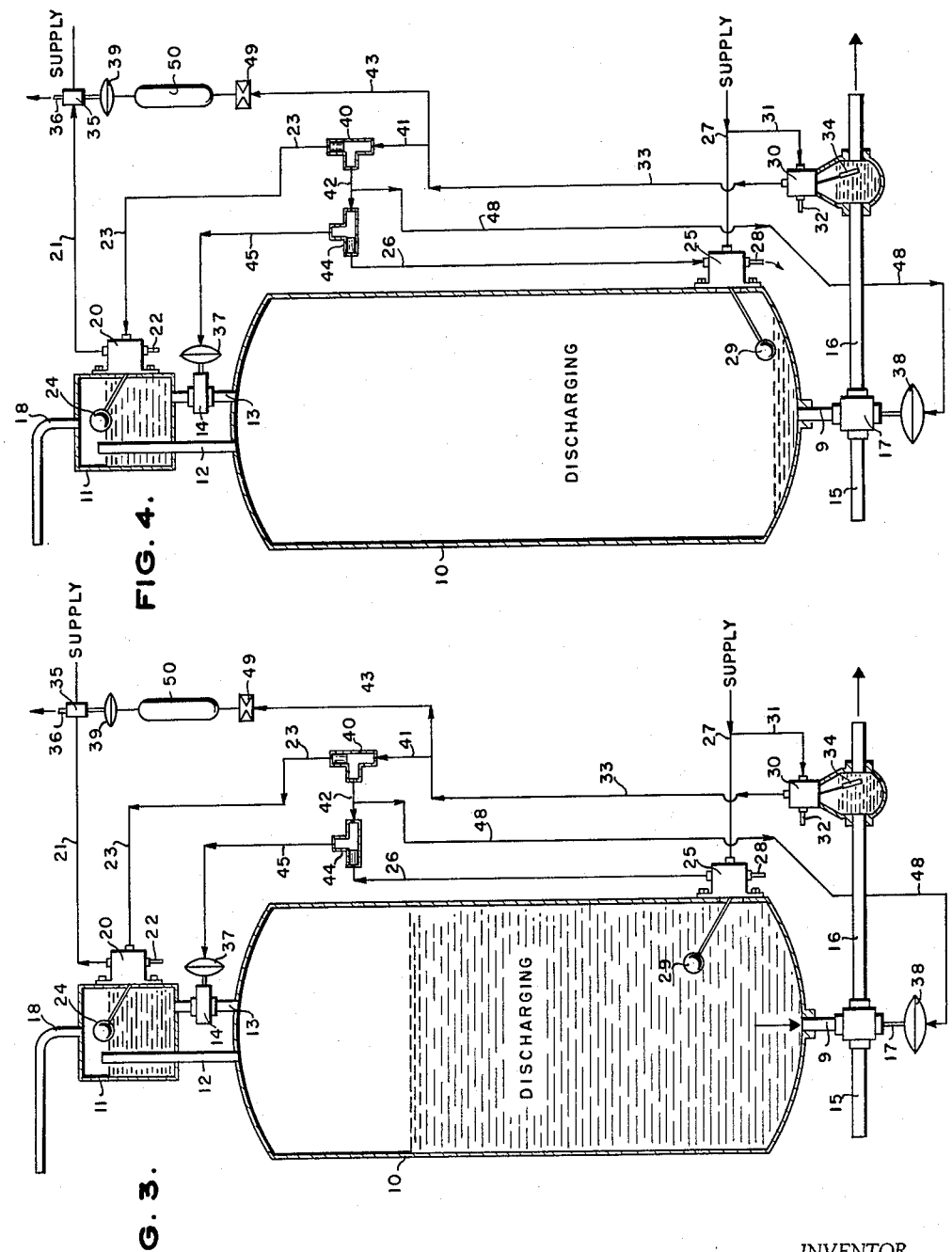
INVENTOR.
MARTIN E. TRUE,
BY John S. Schneider
ATTORNEY.

Nov. 8, 1960   M. E. TRUE   2,959,055
FLUID METER

Filed July 9, 1957   3 Sheets-Sheet 3

INVENTOR.
MARTIN E. TRUE,
BY John S. Schneider
ATTORNEY.

United States Patent Office 2,959,055
Patented Nov. 8, 1960

2,959,055
FLUID METER

Martin E. True, Houston, Tex., assignor, by mesne assignments, to Jersey Production Research Company, Tulsa, Okla., a corporation of Delaware Filed July 9, 1957, Ser. No. 670,759

1 Claim. (Cl. 73—224)

This invention is directed to a positive volume liquid meter for tanks and vessels wherein complete filling and emptying measures a consistent volume of liquid entrapped in each cycle. More specifically, the invention is directed to a metering device wherein a liquid level sensing means is positioned above a 100 percent full closure means of a vessel thereby providing consistent volume measurements in each cycle of filling and emptying.

The invention is also directed to means and method of operation whereby the cyclic operation of the meter is performed automatically.

In methods and apparatus heretofore used for measuring the quantity of oil produced and delivered to a transporting pipe line, the liquid depth in large storage tanks is measured when the tanks are full and then again when substantially empty. Then, the quantity is computed or determined from tables. The liquid depths are normally measured manually with steel gauge tapes and are consequently subject to errors. It is necessary to provide large storage capacity to collect the oil production and hold it until periodic gauging and delivery to the transporting pipe line whose facilities are also necessarily of large capacity because of the periodic-type deliveries made to them. The necessity for hand gauging to measure production to insure accuracy is one of the major obstacles preventing fully automatic and continuous processing of oil production.

While positive displacement meters have heretofore been available on the market, numerous disadvantages are inherent in their use. For example, they employ intricate moving parts which are subject to rapid wear and constant change in accuracy. Moreover, accuracy is frequently dependent upon the rate of flow and upon other factors that introduce inaccuracies.

The present invention avoids such disadvantages. Moreover, it is readily adaptable to automation. Its accuracy is independent of rate of flow. There are no moving parts which when worn affect its accuracy of measurement. Further, it is readily adaptable for use with volumetric compensators for temperature changes, pressure changes or other factors such as the percent or proportion of foreign liquids or other matter in the liquid being measured. Also, it is readily adaptable to incorporation of liquid sampling devices. Moreover, it is equally suitable for use in pressure systems or in atmospheric and gravity systems. It is advantageous for, in addition to its use in the measuring of liquids, automatically proportioning and dividing the measured output, particularly under uneven or intermittent flow conditions.

The principle of operation of this device makes the use thereof independent of the size of the vessel and hence can be applied to many of the present storage tanks with only small additions being necessary in most instances, or it can be built into a small volume tank such as a tank having a capacity of one barrel.

Briefly, the invention comprises a first tank provided with controllable liquid inlet and outlet means arranged thereon. A second tank or reservoir is arranged above the first tank. An overflow means fluidly communicates the upper portion of the first tank with the interior of the second tank. A discharge means fluidly communicates the interiors of the first and second tanks and a valve means is positioned on the discharge means adapted to selectively permit and prevent fluid flow through the discharge means. Starting with the first tank empty, liquid is introduced into the first tank through the liquid inlet until the first tank fills. Then, liquid rises through the overflow means and spills over into the second tank after which introduction of liquid into the first tank is discontinued. During this filling cycle, the valve means is opened and closed in order to discharge the second tank.

The second tank functions to provide means for determining the liquid level therein; it also functions to permit expansion or contraction of the liquid in the first tank through the overflow means. The fixed volume below the uppermost portion of the overflow means is the calibrated volumetric content of the vessel.

The overflow means determines the upper cut-off point which fixes the calibrated volumetric content of the lower tank. By flooding the overflow means, that is, by having the liquid overflow the overflow means into the second tank a full measure of liquid in the first tank is assured even if volumetric changes of the liquid occur. The second tank has sufficient capacity to accommodate such volumetric changes.

The outlet means remains closed until it is desired to deliver the measured quantity of liquid at which time the outlet means is opened and liquid is then withdrawn from the first tank through the outlet means until the first tank is empy or until the liquid level has reached a predetermined lower level in the tank. The first tank is then again ready for refilling and in order to insure that the quantity of liquid removed from the first tank during each emptying cycle is always the same, the liquid outlet fromt he first tank is fully closed no later than the time that the valve means between the first and second anks is opened and no later than the time that liquids are introduced into the first tank through the liquid inlet. The filling cycle is then repeated in order to accomplish a cyclic metering operation.

The invention contemplates either manual operation, partially automatic operation, or fully automatic operation. If manual operation only is desired, means may be provided for giving a visual indication of the presence of liquid in the second tank; a sight glass may be used for this purpose. In order to accompl:sh at least partially automatic operation, a control means is provided in the first tank so as to be operatively responsive to the liquid level in the first tank, the control means being arranged to close the valve means positioned between the first and second tanks. If fully automatic operation is desired, second and third control means are provided in addition to the first control means mentioned above, the second control means being operatively responsive to the liquid discharge from the first tank and the third control means being operatively responsive to the liquid level in the second tank. In this instance, the first, second, and third control means cooperate to control the flow of fluid to and from the first tank through the liquid inlet and outlet means and to control the flow of fluid between the first and second tanks through the valve means positioned therebetween. A pilot control system may be used to control the sequence of steps referred to above. This pilot control system may be suitably a pneumatic system, an electric system, a hydraulic system, or a mechanical system, or combinations thereof. A pneumatic system is hereinafter described.

It is to be noted that numerous types of liquid meters heretofore known employ the principle of a liquid level control to actuate filling and emptying tank valves. However, the difference between known meters and the present invention lies in the mode of obtaining the measurement. Known meters depend upon float or control actuation at exactly the same liquid levels at both full and empty conditions, regardless of the rate of metering. The accuracy of these types of meters depends upon the quick and uniform response of the floats, pilot and control valves in the system and to a degree upon the pressure of the control media. The accuracy of the measurement of the meter described herein is independent of the critical movement of snap-acting valves, counterweights or the effect of specific gravity of the liquid on the triggering point of the float mechanisms. The following description of the nature and operation of the invention is clearly illustrated in the drawings to which reference is now made.

Figs. 1 through 5 diagrammatically illustrate the apparatus of the invention during a fill-discharge cycle of operation.

The arrows in the figures designate the direction of fluid flow. Referring to the figures in greater detail wherein identical numerals designate identical parts:

A tank 10 is shown above which is arranged a chamber or reservoir 11. A pipe 12 extends from the upper end of the tank 10 into the interior of the chamber 11. A conduit 13 fluidly communicates the lower portion of chamber 11 and the upper portion of tank 10. A valve 14 is arranged on conduit 13 and is adapted to control fluid flow through conduit 13. Tank 10, also, is provided with a conduit 9, which fluidly communicates with an inlet conduit 15 to which is connected a source of liquid supply and with a discharge conduit 16, by means of a valve 17. That is, in one position of valve 17, conduits 9 and 15 are in fluid communication and conduits 9 and 16 are out of fluid communication and in another position of valve 17, conduits 9 and 16 are in fluid communication and conduits 9 and 15 are out of fluid communication. Chamber 11 may be provided with a vent or gas equalizing conduit 18.

The operation of the metering device is as follows:

With tank 10 empty, valve 17 is manipulated to fluidly communicate inlet conduit 15 and conduit 9 in which position of valve 17 tank 10 begins to fill. At this time, valve 14 in conduit 13 is in closed position, which prevents fluid communication between tank 10 and chamber 11 through conduit 13. When tank 10 has filled completely, the liquid being metered enters conduit 12 and overflows the upper end thereof into chamber 11. Upon overflow of conduit 12, valve 17 is manipulated to fluidly communicate conduit 9 and discharge conduit 16 to begin discharge of tank 10 including the liquid contained in conduit 12. When tank 10 has completely discharged, valve 17 is manipulated to fluidly communicate conduits 9 and 15 and another cycle is begun. During the fill cycle, valve 14 is manipulated to fluidly communicate chamber 11 and tank 10. The liquid contained in chamber 11 resulting from the overflow of conduit 12 thus discharges into tank 10 and is included in the metered volume of the succeeding cycle.

A series of control elements are shown in Figs. 1 through 5 which control elements are adapted to provide fully automatic metering operation.

With reference to these figures, a liquid level control valve 20 is arranged adjacent chamber 11. Valve 20 has connected thereto a conduit 21, which fluidly communicates with a source of fluid supply, a bleed or exhaust conduit 22 and a conduit 23. Arranged in chamber 11 is a liquid level sensing element such as float 24 connected to valve 20 and adapted to actuate same. Thus, valve 20 fluidly communicates the source of supply through conduit 21 with conduit 23 when float 24 is in an "up" position and bleeds conduit 23 to exhaust conduit 22 when float 24 is in a "down" position. A second liquid level control is arranged preferably in the lower region of tank 10. This control includes a valve 25 to which is connected a conduit 26, a conduit 27 which fluidly communicates with a source of supply and an exhaust conduit 28. A liquid level sensing element such as float 29 is arranged within tank 10 and is adapted to actuate valve 25. Thus, conduits 27 and 26 are placed in fluid communication with each other when the sensing element 29 is in an "up" position and conduits 26 and 28 are placed in fluid communication when the sensing element 29 is in a "down" position.

Figure 1:
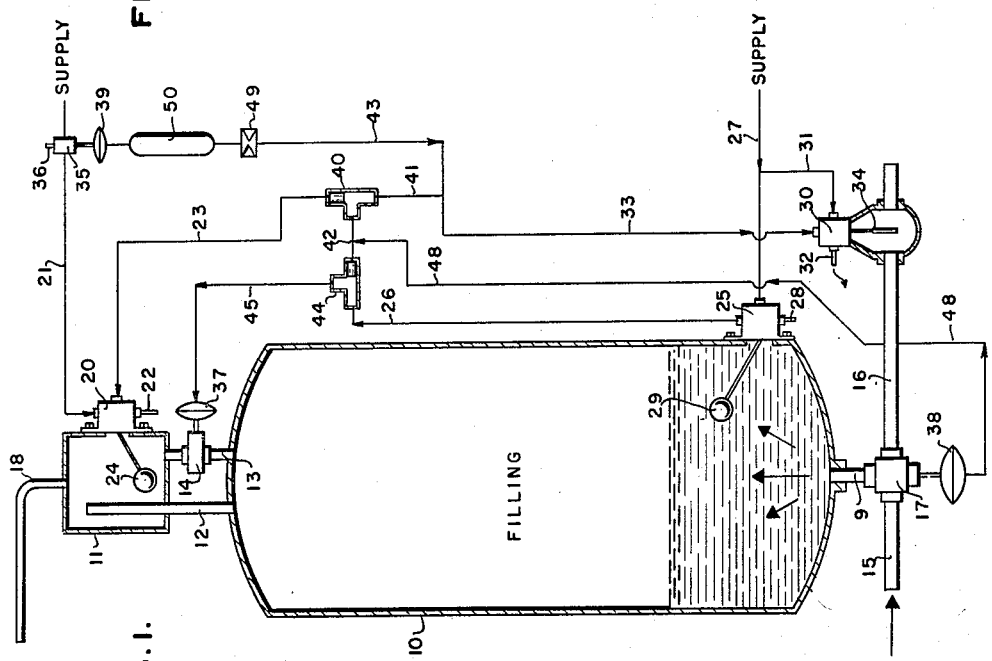
Figure 5:
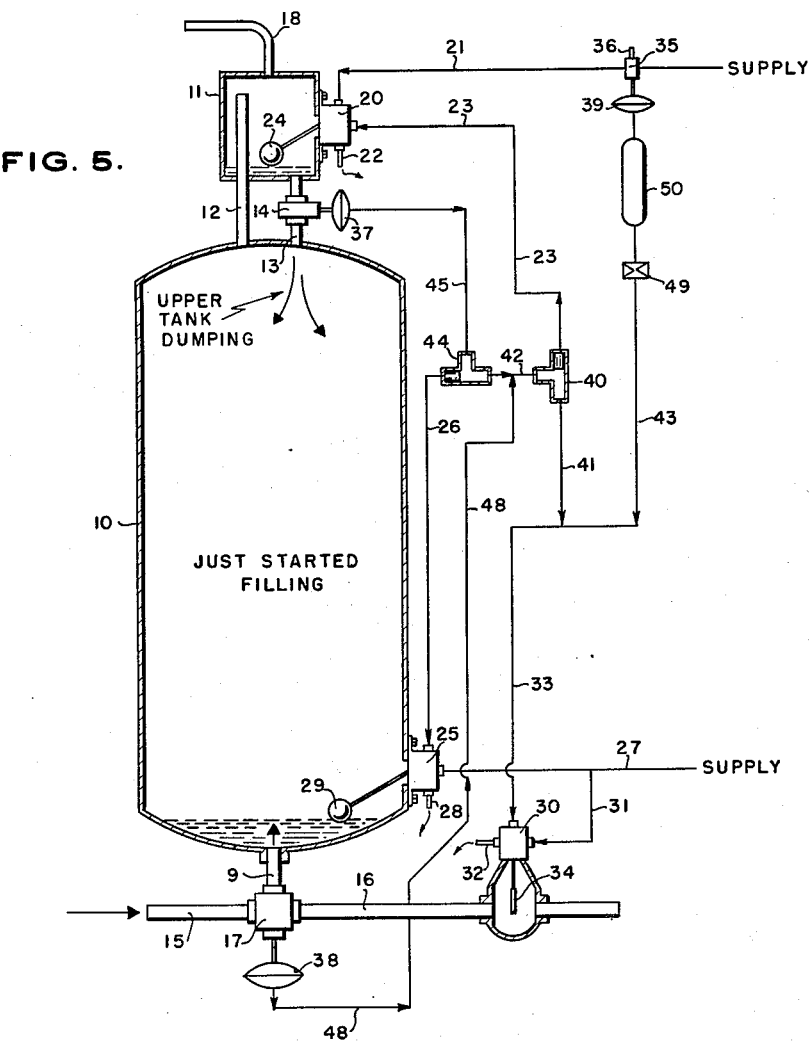

A third control is arranged in discharge conduit 16. This control includes a valve 30 to which is connected a source of supply by means of conduit 31, and exhaust conduit 32, and a conduit 33. A suitable flow sensing element 34 is connected to valve 30 and extends into the path of fluid flow in conduit 16. When sensing element 34 is in an undeflected position, as seen in Figs. 1 and 5, conduit 33 is exhausted to conduit 32. When sensing element 34 is in a deflected position, as seen in Figs. 2, 3, and 4, conduit 31 is in fluid communication with conduit 33.

A valve 35 is arranged on conduit 21 between a source of supply and valve 20, such that in one position the valve fluidly communicates a source of supply and conduit 21 and in another position exhausts conduit 21 to a suitable exhaust conduit 36. Valves 14, 17, and 35 are spring-biased, diaphragm-actuated valves. Thus, valves 14, 17, and 35 are provided with diaphragms 37, 38, and 39, respectively. The operation of these valves is conventional and well-known. A fluid pressure pulse or signal applied to the diaphragm of the valve actuates the valve to one position and exhaust of this pressure signal from the diaphragm actuates the valve to another position.

Valve 14 closes upon application of a fluid pressure signal to diaphragm 37 and opens upon exhaust of the pressure signal from diaphragm 37. Valve 17 fluidly communicates conduits 9 and 15 upon exhaust of a fluid pressure signal from diaphragm 38 and fluidly communicates conduits 9 and 16 upon application of a fluid pressure signal to diaphragm 38. Valve 38 fluidly communicates the fluid pressure supply and conduit 21 upon exhaust of fluid pressure signal from diaphragm 39 and exhausts conduit 21 to conduit 36 upon application of a fluid pressure signal to diaphragm 39.

A double check valve or shuttle valve 40 is connected to conduit 23. Check valve 40 also fluidly communicates with conduits 41 and 42. Conduit 41 fluidly communicates with conduit 33 and also conduit 43, which latter conduit fluidly communicates with diaphragm 39. Conduit 42 fluidly communicates with a second double check or shuttle valve 44. Check valve 44 also fluidly communicates with conduit 26 and conduit 45, which latter conduit fluidly communicates with diaphragm 37. A conduit 48 fluidly communicates conduit 42 and diaphragm 38.

An orifice 49 and volume chamber 50 are arranged in conduit 43. These elements are employed to delay the exhaust of the fluid pressure signal applied to diaphragm 39. The reason it is desired to delay the signal applied to diaphragm 39 will be apparent in the description of the operation which follows:

Referring to Fig. 1 wherein it is assumed that tank 10 is filling and that the liquid level has raised the sensing element 29 to the "up" position, as shown. In this position, valve 17 fluidly communicates conduits 15 and 9 and prevents fluid communication between conduits 16 and 9. Thus diaphragm 38 is exhausted by way of conduit 48. Valve 14 is closed thereby preventing fluid communication between chamber 11 and tank 10. Thus, a fluid pressure signal is applied to diaphragm 37 by way of conduit 45. Sensing element 24 in chamber 11 is in the "down" position thereby fluidly communicating conduit 23 to exhaust conduit 22. Valve 35 fluidly communicates the supply and conduit 21. Thus, conduit 43 exhausts diaphragm 39. Sensing element 34 is in the undeflected position, in which position, conduit 43 is exhausted to exhaust conduit 32. The fluid pressure pulse or signal in conduit 26 is transmitted to conduit 45 via the double check or shuttle valve 44 and conduit 48 is exhausted by way of conduit 42, check valve 40, conduit 41, conduit 33, and conduit 32. Similarly, conduit 43 is exhausted through connected conduit 33 to exhaust conduit 32.

When tank 10 fills completely, the liquid enters conduit or pipe 12 and overflows into chamber 11, as seen in Fig. 2. As the level of liquid rises in conduit 11, the sensing element 24 is raised, as shown. When the sensing element 24 rises to a predetermined level, valve 20 is actuated to fluidly communicate conduits 21 and 23. Thus, a fluid pressure signal or pulse is transmitted through conduit 23 to check valve 40, conduit 42, check valve 44, and conduit 45 to maintain a pressure signal, originally transmitted by way of conduit 26, in conduit 45 to maintain a pressure signal on diaphragm 37 and, in turn, maintain valve 14 closed. Simultaneously therewith a pressure signal is transmitted through conduit 23, check valve 40 and conduit 42 to conduit 48 to apply a pressure signal to diaphragm 38. This latter pressure signal reverses valve 17, which fluidly communicates conduits 9 and 16 and closes off fluid communication between conduits 9 and 15. In this position of valve 17, tank 10 begins to discharge. Discharge of liquid through conduit 16 deflects sensing element 34, which actuates valve 30. Actuation of valve 30 transmits a pressure signal from the supply to conduits 31 and 33, which transmits a pressure signal to conduit 43 and orifice 49.

In Fig. 3, the pressure signal in conduit 43 has been transmitted through orifice 49 and volume chamber 50 to diaphragm 39 to close off supply through valve 35 to conduit 21 and exhaust conduit 21 to conduit 36. A pressure signal is also transmitted to conduit 41 in order to maintain a pressure signal on diaphragms 37 and 38 by way of check valve 40, conduit 42, and check valve 44. Thus, a pressure signal is maintained in conduits 45 and 48.

In Fig. 4, the liquid level in tank 10 has dropped sufficiently to permit sensing element 29 to move to the low position. In this position, conduit 26 is exhausted to conduit 28.

In Fig. 5, tank 10 has completely discharged. Thus, sensing element 34 has assumed the undeflected position. In this position, conduit 33 is exhausted to exhaust conduit 32. Exhaust of conduit 33 exhausts conduit 41. Exhaust of conduit 41 exhausts conduit 42 which, in turn, exhausts conduit 45 through check valve 44 which opens valve 14 and dumps the contents of chamber 11 into tank 10. Also, diaphragm 38 is exhausted by way of conduit 48 and conduit 42 which actuates valve 17 to fluidly communicate inlet conduit 15 and conduit 9 to begin the fill-cycle as shown in Fig. 1. When the liquid level in chamber 11 drops, sensing element 24 causes valve 20 to actuate to fluidly communicate conduits 23 and 22 thereby exhausting conduit 23. Exhaust of conduit 33 also exhausts conduit 43 which transmits a fluid pressure signal to conduit 21. Chamber 50 and orifice 49 delay exhaust of pressure on diaphragm 39 until after sensing element 24 causes valve 20 to fluidly communicate conduits 23 and 22. Also, conduit 43 is exhausted via conduits 33 and 32 which, in turn, through orifice 49 and chamber 50 exhausts the fluid pressure signal on diaphragm 39. Exhaust of fluid pressure from diaphragm 39 opens valve 35 to transmit a fluid pressure pulse or signal to conduit 21 from the supply.

The complete cycle of operation, described supra, is then repeated.

This device is adaptable for use with many types of control systems other than the fully automatic and manual operations, described supra. For example, any desired type of semi-automatic operation may be utilized.

The description of the invention has shown and described only a few types of control mechanisms. The demands in any particular installation and the different possible combinations employable therewith will be obvious for industrial users and are to be considered within the scope of this invention. The described method and apparatus for obtaining accurate tank measurements are adaptable to any manner of control from simple manual operation to self-actuating, fully automatic, remote control operation. It is possible to adapt this automatic control system to two or more tanks whereby one or more of the tanks are being filled while one or more of the other tanks are being discharged. This may be accomplished merely by adjusting the controls described and contemplated by this invention.

Although oil production operations were specified in describing the operation of this invention, other liquids or mixtures of liquid and solids may be measured similarly so long as the mixture retains liquid characteristics. Accordingly, the term "liquid" as used herein may include gases mixed with or dissolved in the liquid metered and may include liquids containing suspended solids.

Whenever the term "empty" is used in this specification or the appended claim with reference to the lower tank of the present device, it shall mean either that the tank is completely devoid of liquid or that the liquid level in the tank has reached a predetermined low level.

Various valves and control devices were described herein. These elements are conventional and form no part of the present invention.

Having fully described the nature, objects, operation and structure of my invention, I claim:

A metering device comprising a first tank provided with valve means for controlling flow of fluid to and from said first tank; a second tank arranged above said first tank; a vertically extending overflow conduit interconnecting the upper portion of said first tank and the interior of said second tank such that when said first tank fills liquid enters said overflow conduit and overflows into said second tank; a vertically extending discharge conduit interconnecting the interiors of said first and second tanks for discharging liquid from said second to said first tank; a discharge valve connected in said discharge conduit for opening and closing to permit and prevent, respectively, discharge of liquid from said second to said first tank; said discharge valve being open when said first tank begins to fill and closed when said first tank fills and overflows into said second tank through said overflow conduit; first control means operatively responsive to discharge and non-discharge of liquid from said first tank; second control means operatively responsive to higher and lower liquid levels in said first tank; third control means operatively responsive to higher and lower liquid levels in said second tank; actuating means operatively responsive to the operation of said first, second and third control means for operating said valve means and said discharge valve; said first control means in response to non-discharge of liquid from said first tank, said second control means in response to a lower liquid level in said first tank, and said third control means in response to a lower liquid level in said second tank cooperating to control said actuating means to open said discharge valve to permit discharge of liquid from said second tank to said first tank and to admit liquid to said first tank and to prevent discharge of liquid from said first tank; said first control means in response to non-discharge of liquid from said first tank and said second control means in response to a higher liquid level in said first tank and said third control means in response to a lower liquid level in said second tank cooperating to control said actuating means to close said discharge valve and to maintain said valve means in position to admit liquid to said first tank and prevent discharge of liquid from said first tank; said first control means in response to non-discharge of liquid from said first tank and said second control means in response to a higher liquid level in said first tank and said third control means in response to a higher liquid level in said second tank cooperating to control said actuating means to maintain said discharge valve closed and to actuate said valve means to prevent admission of liquid to said first tank and permit discharge of liquid from said first tank; and said first control means in response to discharge of liquid from said first tank, said second control means in response to a lower liquid level in said first tank, and said third control means in response to a higher liquid level in said second tank co-operating to control said actuating means to maintain said discharge valve closed and to maintain said valve means in position to prevent admission of liquid to said tank and permit discharge of liquid from said tank.

References Cited in the file of this patent

UNITED STATES PATENTS

| | | |
|---|---|---|
| 1,665,093 | Gouvion | Apr. 3, 1928 |
| 1,746,382 | Davis | Feb. 11, 1930 |
| 2,831,350 | Banks et al. | Apr. 22, 1958 |
| 2,872,817 | Pitts | Feb. 10, 1959 |

FOREIGN PATENTS

| | | |
|---|---|---|
| 947,663 | France | Jan. 17, 1949 |